C. LE G. FORTESCUE.
RELAY SYSTEM.
APPLICATION FILED MAR. 4, 1915.

1,295,885.

Patented Mar. 4, 1919.
2 SHEETS—SHEET 1.

WITNESSES:
Fred. A. Lind.
J H Procter

INVENTOR
Charles LeG. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

RELAY SYSTEM.

1,295,885.

Specification of Letters Patent.

Patented Mar. 4, 1919.

Application filed March 4, 1915. Serial No. 12,069.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Relay Systems, of which the following is a specification.

My invention relates to relay systems and particularly to relay systems that are adapted to operate when a circuit to which they are connected becomes grounded.

The object of my invention is to provide a relay system that operates to either suppress the ground or open the circuit when the circuit becomes grounded.

It is well known that a short circuit or ground usually occurs during the peak of the electromotive force wave. Hence, if the circuit to be protected is provided with potential transformers that are connected, at one terminal, to the conductor to be protected and, at the other terminal, to ground and if the secondary windings of these transformers are connected in local circuit with a condenser and a trip coil, the condenser may be so proportioned that, when the voltage changes suddenly, by reason of a ground or other disturbance, the condenser will discharge, at the frequency of its own circuit, to energize the trip coil. The trip coil may be arranged to provide a low-resistance ground connection for the conductor to actuate an alarm device or to disconnect the faulty conductor from the circuit.

Figure 1:
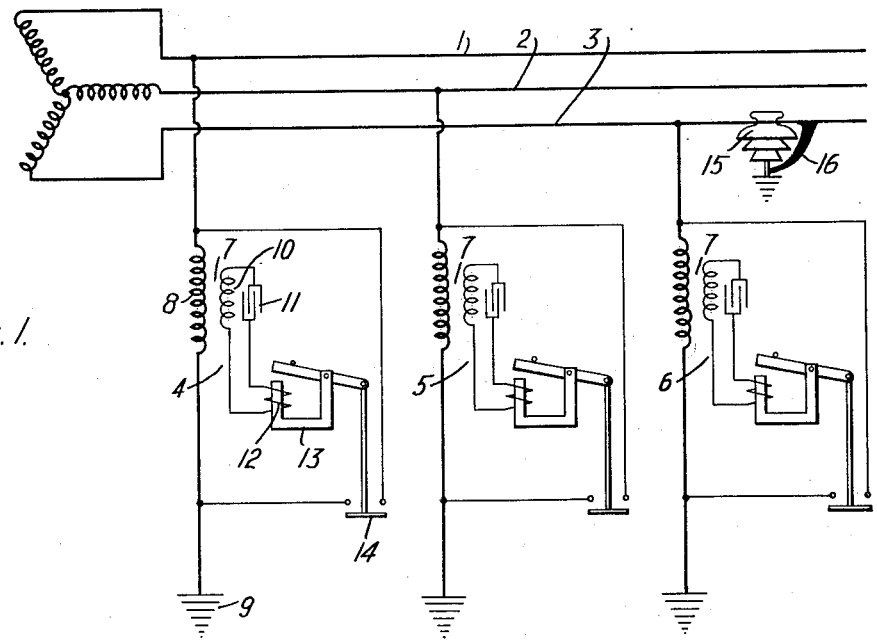
Figure 2:
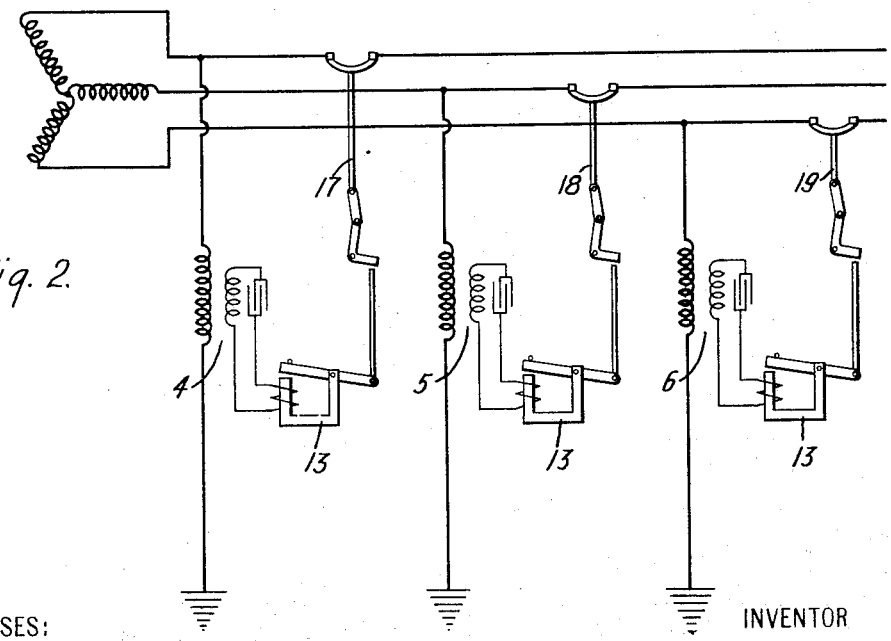
Figure 3:
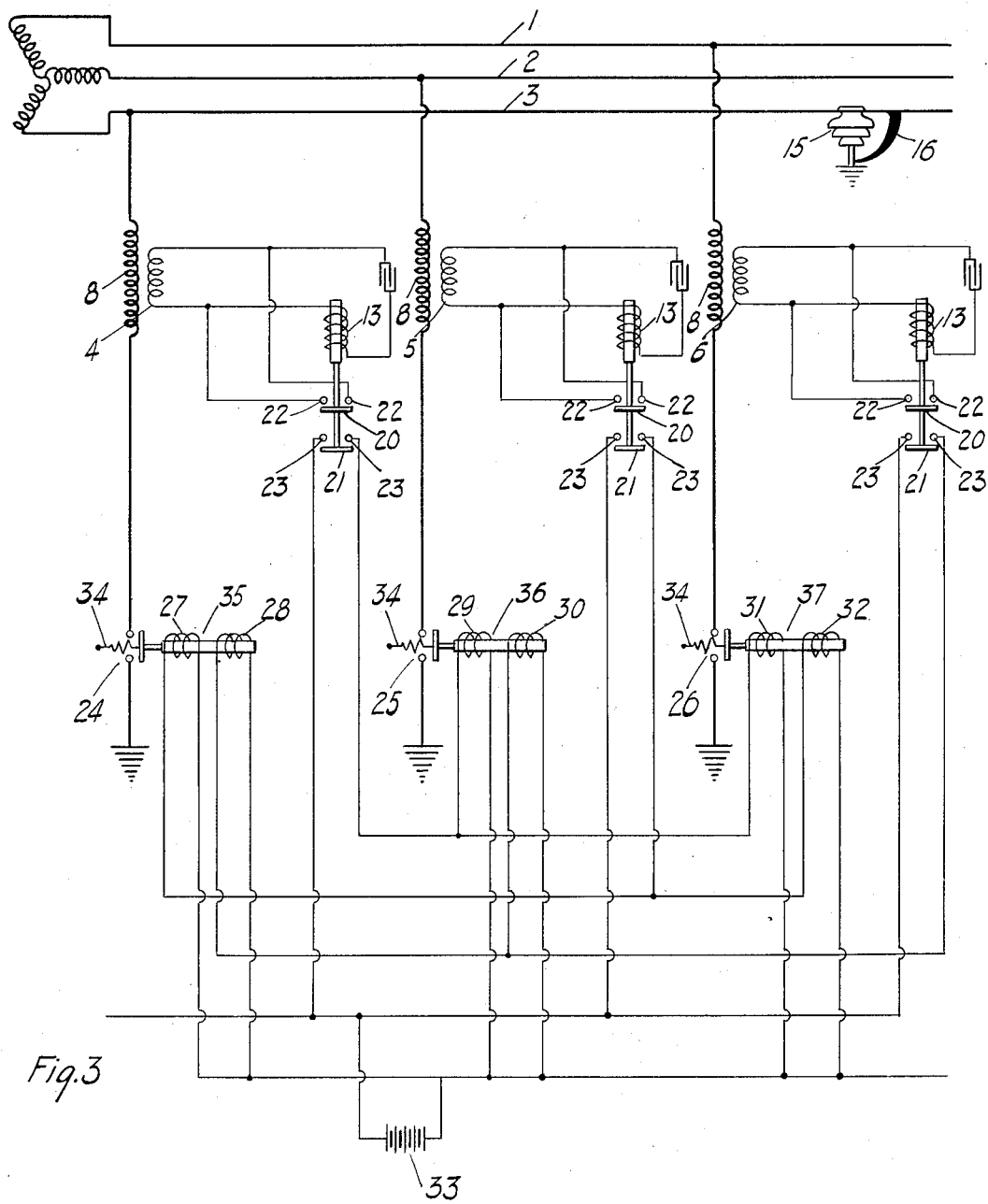

In the accompanying drawings, Figure 1 is a diagrammatic view of a distributing circuit in which my invention is embodied; Fig. 2 is a diagrammatic view of a distributing circuit in which a modified form of my invention is embodied; and Fig. 3 is a diagrammatic view of a distributing system in which another modified form of my invention is embodied.

In Fig. 1 of the drawings, the conductors 1, 2 and 3, constituting a three-phase distributing circuit, are afforded protection against arcing grounds by means of a plurality of relay systems 4, 5 and 6. The relay systems 4, 5 and 6 severally comprise a transformer 7, the primary winding 8 of which is connected between ground 9 and the conductor of the distributing circuit to be protected and the secondary winding 10 of which is connected in a local circuit with a condenser 11 and the winding 12 of an electromagnet 13. The electromagnet 13 is adapted to actuate a switch 14 for the purpose of short circuiting the primary winding 8 of the transformer 7, under predetermined conditions hereinafter more fully set forth.

Inasmuch as these relay systems are identical in operation, it is only necessary that the operation of a single relay system be described. When an arc extends from the conductor 3 over an insulator 15 to ground, the voltage impressed upon the primary winding 8 of the transformer 7 is reduced to that of the effective potential drop along the arc 16. Since this reduction occurs suddenly, the frequency of the circuit through the winding 8 is changed and, consequently, the condenser 11 is permitted to instantly discharge at its predetermined periodicity. The discharge of the condenser 11 causes current to traverse the winding 12 which actuates the electromagnet 13, to thereby close the switch 14 and provide a relatively low-resistance circuit to ground. The affected conductor 3 is thus connected to ground through a substantially low-resistance circuit and, consequently, the arc 16 is extinguished because of insufficient potential to maintain it. The insulator 15 will resume its normal condition of insulation as soon as the arc vapors are cooled below the temperature of conduction which requires but a small fraction of a second of time.

In Fig. 2 of the drawings, the relay systems 4, 5 and 6 are so arranged that the electromagnets 13 are adapted to trip circuit interrupters 17, 18 and 19 that are connected to the conductors 1, 2 and 3, respectively, whenever one of the conductors becomes grounded. Since the operation of the relay systems 4, 5 and 6 are substantially the same as set forth with respect to the device shown in Fig. 1, it is necessary merely to state that, whenever a ground occurs upon one of the conductors of the distributing circuit, that particular conductor will be disconnected from the circuit to prevent injury to any translating devices that may be connected thereto. This system is shown merely for the purpose of indicating some of the various operations that may be performed by a relay system embodying my invention.

In Fig. 3 of the drawings, conductors 1, 2 and 3 constitute a distributing circuit that is protected by relay systems 4, 5 and 6 substantially the same as hereinbefore set forth with respect to Figs. 1 and 2 of the drawings. The electromagnet 13 of each of the relays is provided with two bridging contact members 20 and 21 which are adapted to engage pairs of stationary contact members 22 and 23, respectively. The stationary contact members 22 are so connected to the terminals of the secondary winding 10 of the transformer 7 that, when they are engaged by the bridging contact members 20, the winding is short circuited so that the primary winding 8 will present a very low-impedance circuit to the flow of current therein. Switches 24, 25 and 26 are connected in circuit with the corresponding primary windings of the transformers 8 of the relay systems 4, 5 and 6, respectively, and are adapted to be opened by a plurality of windings 27 and 28, 29 and 30 and 31 and 32, that are disposed around movable core members 35, 36 and 37, respectively.

When the movable contact members 21 of the electromagnets 13 engage the stationary contact members 23, a circuit is completed from a battery, or other source of electromotive force, through one of the windings on each of the switches other than the one that is connected in the circuit in which the ground occurs. That is, assuming that a ground occurs on the conductor 3 and that an arc 16 extends from the conductor 3 to ground around the insulator 15, the electromagnet 13 of the relay 4 will be actuated to open the switches 25 and 26 by reason of the energization of the windings 29 and 31. From this it will be seen that, as the switches 24 and 25 and 26 are normally biased in their closed positions by springs 34, only that circuit upon which the ground occurs is connected to the ground since, if a ground occurs on two conductors at one time, the same ill effects will obtain as if the two conductors were short circuited upon each other. Likewise, if a ground occurs upon conductor 2, the switch 25 will remain closed and the switches 24 and 26 will be opened by reason of the energization of the windings 27 and 32 and, similarly, if the ground occurs on the conductor 1, the switch 26 will remain closed and switches 24 and 25 will be opened by reason of the energization of the windings 28 and 30.

While I have shown and described, in detail, several of the embodiments of my invention, it will be understood that the electromagnet 13 may be adapted to operate other devices without departing from the spirit and scope of the invention as set forth in the appended claims.

I claim as my invention:

1. A system of distribution comprising a source of energy, a distributing circuit, a transformer having its primary winding connected between a conductor of the distributing circuit and the ground, a condenser and an electromagnet connected in a local circuit with the secondary winding of the transformer, said electromagnet being adapted to operate when the voltage of the distributing circuit changes suddenly, and means actuated by the electromagnet for decreasing the voltage of the circuit.

2. A system of distribution comprising a distributing circuit, a transformer having its primary winding connected between one conductor of the distributing circuit and the ground, a local circuit comprisng the secondary winding of the said transformer, a condenser and the winding of an electromagnet, said local circuit being so proportioned that the condenser discharges when the voltage of the distributing circuit changes suddenly, and means for short-circuiting the primary winding of the transformer when the winding of the electromagnet is energized.

3. A system of distribution comprising a distributing circuit, a transformer having its primary winding connected between one conductor of the distributing circuit and the ground, an electromagnet winding connected in circuit with the secondary winding of the transformer, means whereby the said electromagnet winding is energized when the voltage of the distributing circuit changes suddenly, and means actuated by the electromagnet winding for reducing the voltage of the circuit to substantially ground potential.

4. A system of distribution comprising a distributing circuit, a transformer having its primary winding connected between one conductor of the distributing circuit and the ground, an electromagnet winding and a condenser connected in circuit with the secondary winding of the transformer, said condenser being adapted to discharge when the voltage of the distributing circuit changes suddenly, and means for connecting the circuit through a relatively low impedance path to ground when the electromagnet winding is energized.

5. A system of distribution comprising a distributing circuit, a transformer having its primary winding connected between one conductor of the distributing circuit and the ground, an electromagnet winding and a condenser connected in a local circuit with the secondary winding of the transformer, and means for decreasing the resistance of the path to ground through the primary winding of the transformer when the condenser discharges by reason of a sudden change in voltage in the distributing circuit.

6. A system of distribution comprising an alternating-current distributing circuit, a plurality of transformers the primary windings of which are connected between corresponding conductors of the circuit and the ground, a plurality of local circuits severally comprising an electromagnet winding and a condenser connected in circuit with the secondary windings of the several transformers, and a plurality of switches, said electromagnet windings being adapted to be energized to actuate the switches when the voltage of the distributing circuit changes suddenly.

7. A system of distribution comprising an alternating-current distributing circuit, a plurality of transformers the primary windings of which are connected between the corresponding conductors of the circuit and the ground, a plurality of local circuits severally comprising an electromagnet winding and a condenser connected in circuit with the secondary winding of the several transformers, said electromagnet windings being adapted to be energized when the voltage of the distributing circuit changes suddenly, and means adapted to be actuated when the electromagnet winding is energized for reducing the voltage on the circuit.

8. A system of distribution comprising a distributing circuit, a transformer having its primary winding connected between one conductor of the circuit and the ground and its secondary winding connected in a local circuit, said local circuit being so constituted that current traverses the same only when the voltage of the main circuit changes suddenly, and means for decreasing the voltage on the circuit when current traverses the local circuit.

9. The combination with a conductor, of a transformer having its primary winding connected between the conductor and the ground, an auxiliary circuit comprising a condenser and an electromagnet connected in circuit with the secondary winding of the transformer, and means actuated by the electromagnet for reducing the voltage on the conductor when the voltage thereon changes suddenly.

10. The combination with a conductor, of a transformer having its primary winding connected between the conductor and the ground, an auxiliary circuit comprising a condenser and an electromagnet connected in circuit with the secondary winding of the transformer, and means actuated by the electromagnet for reducing the voltage on the conductor when a ground occurs on the conductor.

11. The combination with an electric circuit, of a transformer having its primary winding connected between one conductor of the circuit and ground, and means connected in circuit with the secondary winding of the transformer for decreasing the voltage on the circuit when the current in the primary winding of the transformer changes suddenly only.

12. The combination with an electric circuit, of means responsive to a relatively sudden change only in voltage of the circuit for operatively connecting the circuit to the ground through a relatively low-resistance connection.

13. The combination with an electric circuit, of means responsive to a relatively sudden change only in voltage of the circuit for reducing the voltage on the circuit by effecting a relatively low-resistance connection between the circuit and ground.

In testimony whereof, I have hereunto subscribed my name this 20th day of Feb. 1915.

CHARLES LE G. FORTESCUE.

Witnesses:
W. M. McCONAHY,
B. B. HINES.